United States Patent [19]
Petit

[11] Patent Number: 5,732,116
[45] Date of Patent: Mar. 24, 1998

[54] SPACER GRID OF A FUEL ASSEMBLY FOR A NUCLEAR REACTOR, INCLUDING ATTACHED SPRINGS

[75] Inventor: Bernard Petit, Brignais, France

[73] Assignees: Framatome, Courbevoie; Cogema, Velizy-Villacoublay, both of France

[21] Appl. No.: 674,236

[22] Filed: Jun. 28, 1996

[30] Foreign Application Priority Data

Jun. 29, 1995 [FR] France ................................ 95 07852

[51] Int. Cl.$^6$ ........................................ G21C 3/34
[52] U.S. Cl. ................................................ 376/441
[58] Field of Search ............................. 376/441, 442, 376/446, 462

[56] References Cited

U.S. PATENT DOCUMENTS

| | | | |
|---|---|---|---|
| 3,679,546 | 7/1972 | Muellner | 376/441 |
| 4,364,902 | 12/1982 | Feutrel | 376/441 |
| 4,844,862 | 7/1989 | Sartor | 376/441 |
| 5,069,864 | 12/1991 | Johansson | 376/441 |
| 5,311,564 | 5/1994 | Steinke | 376/441 |

FOREIGN PATENT DOCUMENTS

| | | |
|---|---|---|
| 0 280 595 A3 | 8/1988 | European Pat. Off. . |
| 0 025 393 A1 | 3/1991 | European Pat. Off. . |
| 0 452 706 A1 | 10/1991 | European Pat. Off. . |
| 0 527 244 A1 | 2/1993 | European Pat. Off. . |
| 2.168.059 | 8/1973 | France . |

*Primary Examiner*—Daniel D. Wasil
*Attorney, Agent, or Firm*—Pollock, Vande Sande & Priddy

[57] ABSTRACT

A spacer grid spring (6) consists of a single metal leaf including two end parts (6a, 6b) substantially in the same plane and a central part (6c) out of the plane of the end parts (6a, 6b). At least one of the end parts (6a, 6b) is laterally provided with two flanges (6d, 6e) folded out of the plane of the end part (6a, 6b), in the opposite direction from the central part (6c) of the spring (6). The cell wall (5) intended to receive the spring (6) includes, in an arrangement adjacent to each of two dimples (7a, 7b) placed at the ends of the wall (5), a part (8a, 8b) for holding an end (6a, 6b) of the spring, and an opening (10a, 10b) passing through the wall (5) adjacent to the holding part (8a, 8b).

10 Claims, 4 Drawing Sheets

5,732,116

SPACER GRID OF A FUEL ASSEMBLY FOR A NUCLEAR REACTOR, INCLUDING ATTACHED SPRINGS

FIELD OF THE INVENTION

The invention relates to a spacer grid of a fuel assembly for a nuclear reactor, including attached springs.

BACKGROUND OF THE INVENTION

The fuel assemblies of nuclear reactors, in particular of light water nuclear reactors, generally consist of a bundle of fuel rods, that is to say tubes made of a material which is a weak neutron absorber, filled with pellets of fissile material. The fuel rod bundle constituting a fuel assembly is held by a rigid framework including spacer grids distributed along the length of the bundle, longitudinal guide tubes introduced and fixed inside some cells of the spacer grids, and end nozzles which close the framework and hold the rods at each of the ends of the fuel assembly. The spacer grids consist of interlaced straps defining generally parallelepipedal cells arranged in a lattice, generally with square units. The spacer grids transversely hold the fuel rods in the bundle, the fuel rods passing through the interior of the cells of the grids. In this way, the rods have a regular arrangement in the transverse directions, which is set by the grids. Some of the cells are occupied by guide tubes which are connected at their ends to the closure nozzles of the assembly. Each cell of a spacer grid receives either a fuel rod or a guide tube.

In order to hold the fuel rods transversely inside the cells of the spacer grids, it is necessary to exert transverse forces on these rods, and for this purpose to provide holding devices, supported by the walls of the cells of the grid and extending into the interior of the cells.

Each of the cells has a size such that a large clearance is provided between the rod and the walls of the cell. This clearance is necessary to allow flow of the nuclear reactor coolant and to facilitate mounting of the rods in the assembly.

Devices have been proposed, for holding the fuel rods in the cells of the spacer grids, which consist of springs having an active elastic part projecting into a cell intended to receive a fuel rod, and rigid bearing stops, also projecting into the cell, opposite the springs. The fuel rod introduced into the cell is pushed into position bearing against the stops by the spring located opposite the stops.

Generally, each of the parallelepipedal cells intended to receive a fuel rod includes springs on two adjacent walls and two sets of two bearing stops on two adjacent walls, located opposite the walls on which springs are provided.

If the straps constituting the spacer grid are made of a material with high elasticity, both the dimples and the springs can be made by cutting and pushing in the parts of the walls of the cells, themselves consisting of the straps of the grid. However, such spacer grids have limited use, insofar as materials with high elasticity and high mechanical strength produce strong absorption of the neutrons supplied by the fuel elements of the assembly.

It has therefore been proposed to produce spacer grids from straps made of a material which is a weak neutron absorber, such as a zirconium alloy. In this case, springs made of an elastic material, such as a nickel alloy, are attached onto the walls of the cells located opposite the walls in which the bearing dimples have been produced by cutting and pushing in the material of the straps. The spring is usually made in the form of a hairpin including two branches having a convex curved part intended to constitute the active part of the spring, which projects into a cell of the spacer grid. The hairpin springs are engaged on the walls intended to receive them in such a way that the spring completely surrounds the wall on which it is mounted. The wall is generally penetrated by openings or windows, at which the two branches of the spring can come into contact with each other in order to be welded, so that the spring is held on the wall.

Hairpin springs generally include two branches constituting two active spring parts which project into two neighbouring cells of the grid. Such springs are called double springs. Springs called single springs are also used, which include a single active branch and the second branch of which includes bosses for holding the spring, which enter openings passing through the wall of the grid. Also in the case of single springs, the spring is held around the wall of the grid by welds joining its two branches.

Hairpin springs are relatively complex to produce, and the operations of fitting these springs, which require welding, lengthen and complicate the operations of mounting the spacer grids. Indeed, each of the spacer grids includes several hundred cells and most of the cells include two walls on which springs are mounted.

In cells receiving double springs, the deformation of one of the branches of the spring is influenced by the deformation of the other branch. The water passages through the cells furthermore have variable shape and size, which influences the distribution of the cooling water flows around the fuel rods.

Furthermore, welding the branches of the springs may lead to certain changes in the mechanical properties of the metal of the springs, and even a degree of embrittlement of this metal.

SUMMARY OF THE INVENTION

The object of the invention is therefore to provide a spacer grid of a fuel assembly for a nuclear reactor, consisting of interlaced metal straps defining a regular lattice of cells, at least a part of which includes, for each cell, at least one wall for separation from a neighbouring cell, consisting of a portion of a strap, on which a spring for holding a fuel rod intended to be housed in the cell is attached and immobilized, the wall of the cell being cut and pushed into the neighbouring cell in two end zones spaced apart in a longitudinal mounting direction of the spring, in order to constitute two dimples for holding a rod in the neighbouring cell, this spacer grid including cells which can be produced and mounted in simple fashion, without requiring a welding operation for immobilizing them on the walls of the grid.

To this end, each spring consists of a single metal leaf including two end parts substantially in the same plane and a central part out of the plane of the end parts, at least one of the end parts being laterally provided with two flanges bent out of the plane of the end part, in the opposite direction from the central part of the spring, and each wall intended to receive an attached spring includes, in an arrangement adjacent to each of the dimples, in the direction of the second dimple, a part for holding an end of the spring and, in an arrangement adjacent to at least one of the holding parts, at least one opening passing through the wall.

BRIEF DESCRIPTION OF THE DRAWINGS

In order to explain the invention clearly, a description will now be given, by way of nonlimiting example, of a spacer

3 grid according to the invention and according to a plurality of alternative embodiments.

Figure 1:
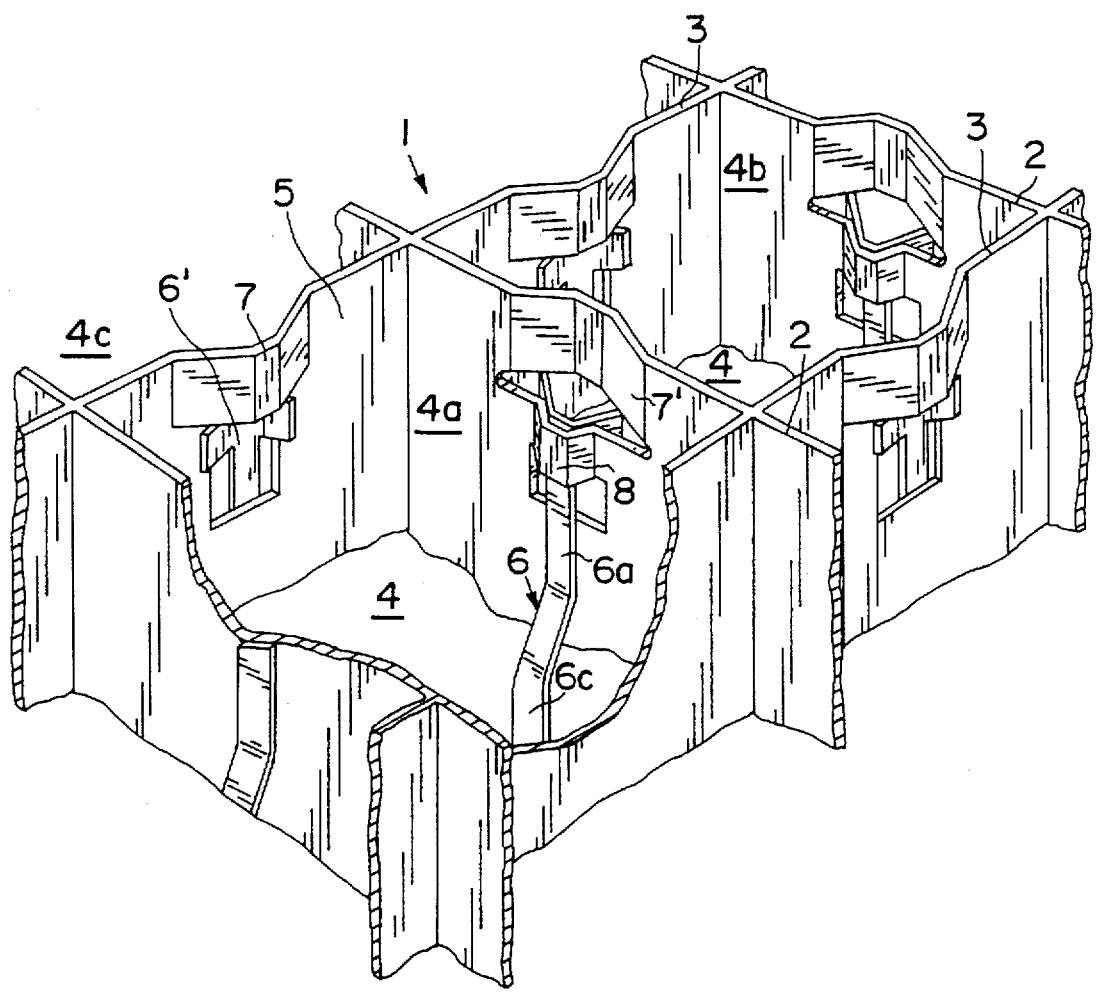

FIG. 1 is a partial perspective view of a spacer grid according to the invention.

Figure 2:
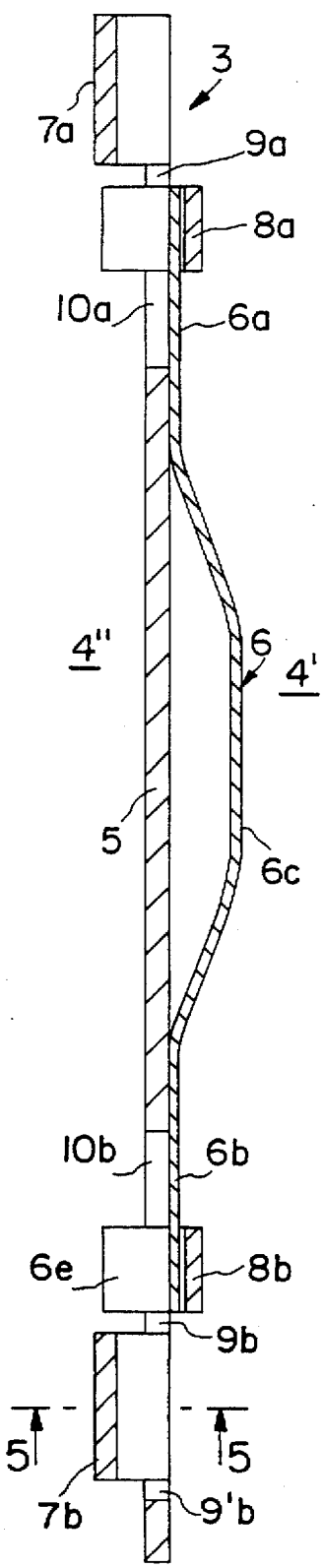

FIG. 2 is a sectional view on an axial plane of a wall of a cell of a spacer grid according to the invention and according to a first embodiment, including a spring.

Figure 3:
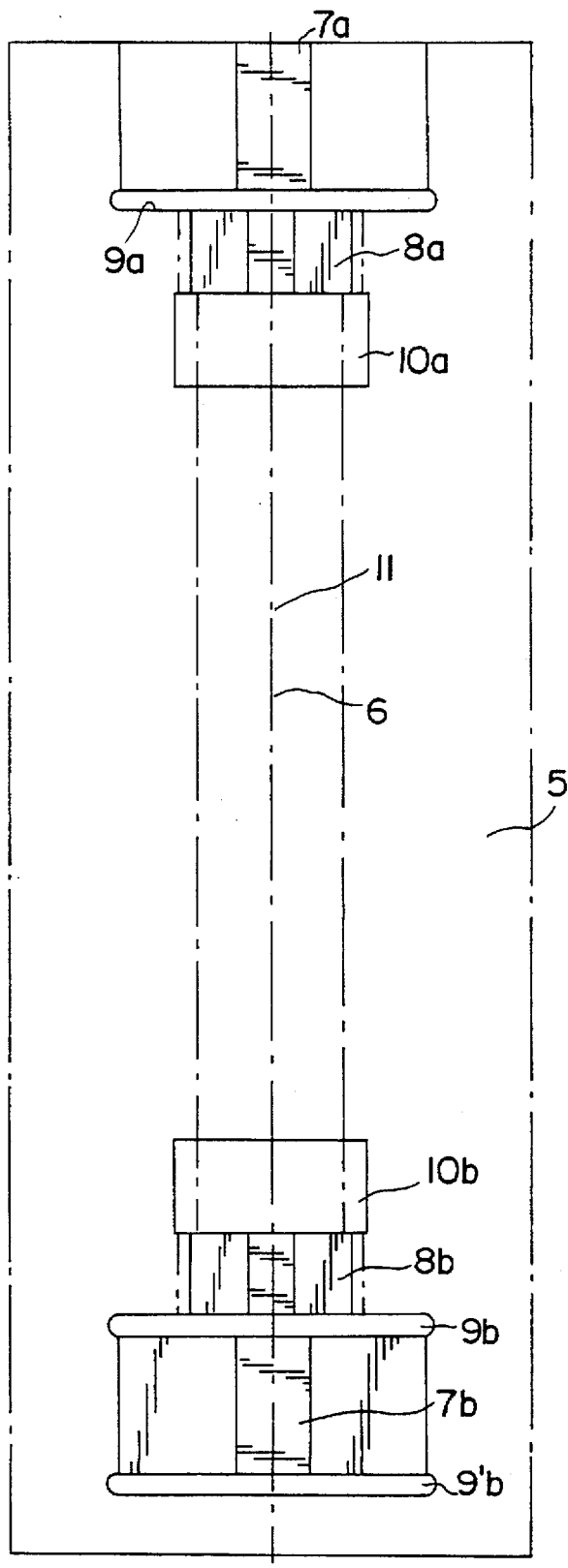

FIG. 3 is a front view along 3 of FIG. 2 of the wall of the cell.

Figure 4:
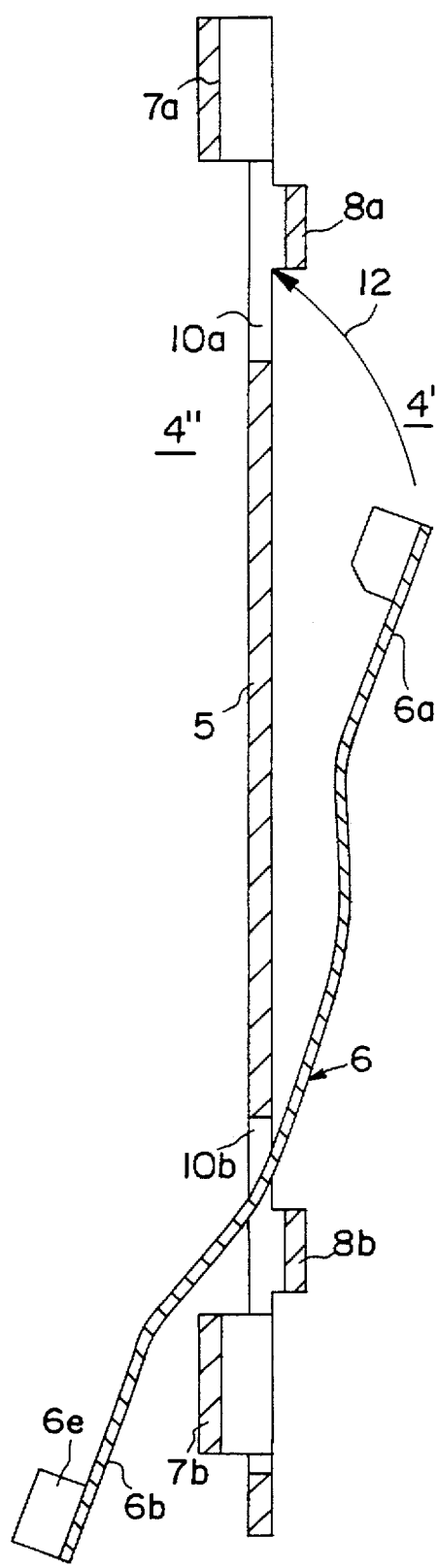

FIG. 4 is a sectional view similar to the view in FIG. 2, showing the wall and the spring during mounting of the spring.

Figure 5:
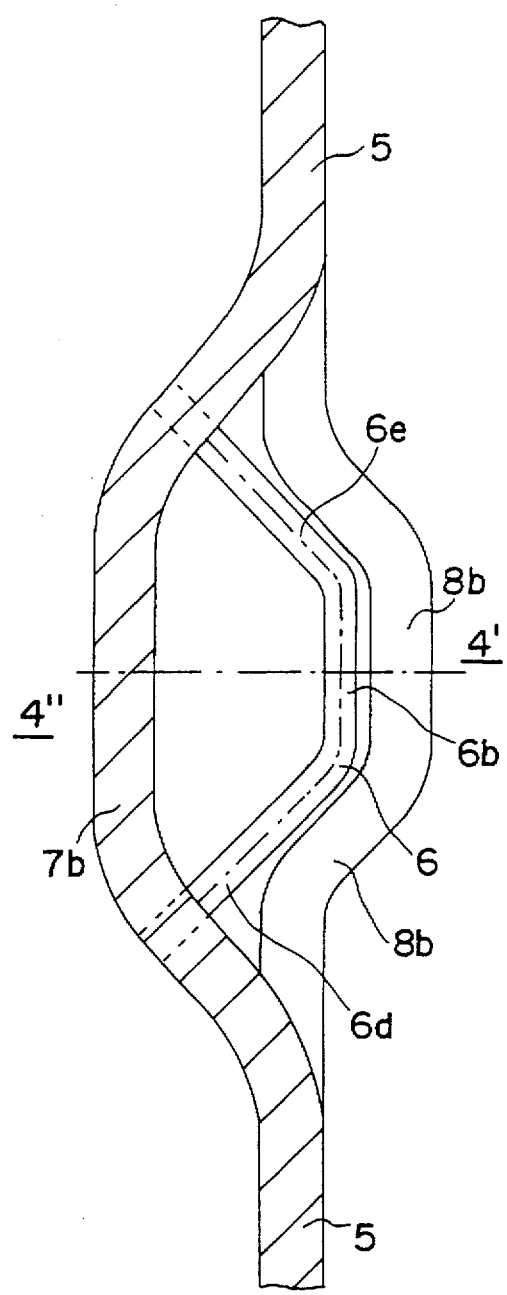

FIG. 5 is a view in transverse section on 5—5 of FIG. 2.

Figure 6:
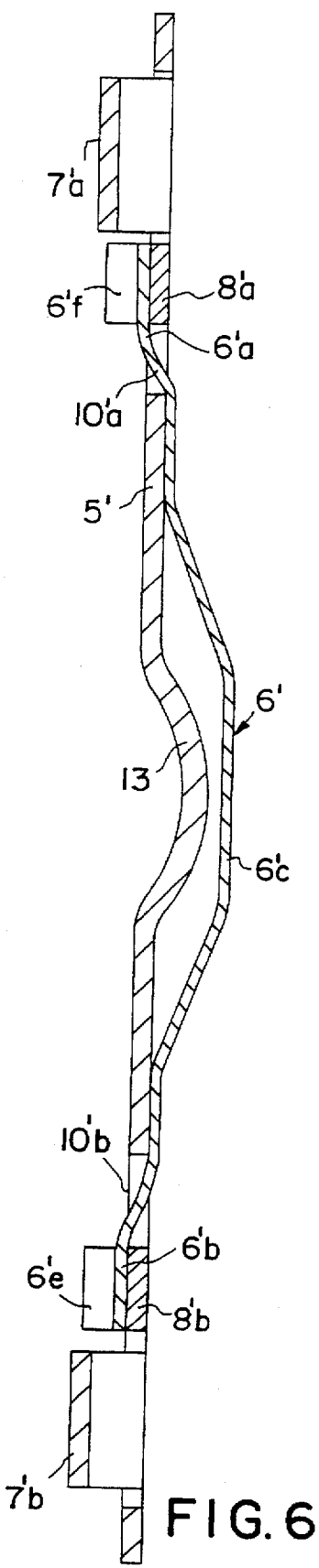

FIG. 6 is a sectional view on an axial plane of a wall of a cell and of a spring of a spacer grid according to a second embodiment.

Figure 7:
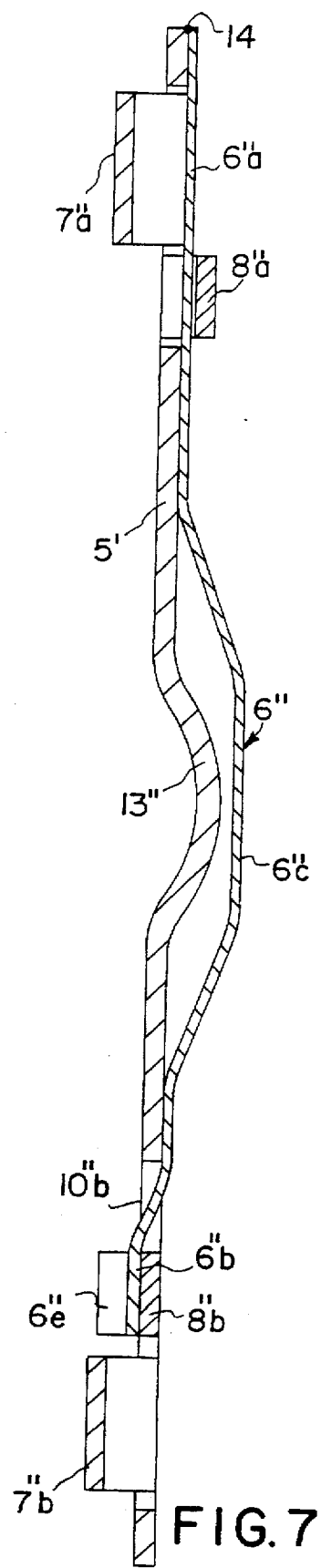

FIG. 7 is a sectional view similar to FIGS. 4 and 6 of a wall of a cell and of a spring of a spacer grid according to a second alternative embodiment.

DESCRIPTION OF PREFERRED EMBODIMENT

FIG. 1 shows a part of a spacer grid according to the invention, denoted overall by the reference 1.

The grid 1 consists of sets of interlaced straps 2 and 3, the straps 2 of a first set being perpendicular to the straps 3 of the second set of straps.

The straps 2 and 3 define parallelepipedal cells 4 of square cross-section, each including four walls 5 which each consist of a portion of a strap 2 or 3.

Most of the cells 4 of the spacer grid 1 are intended to receive fuel rods, the diameter of which is substantially less than the side of the square cross-section of the cells 4. The fuel rods are held inside the cells 4 by springs such as the spring 6 of the cell 4a and dimples such as the dimple 7 of the cell 4a represented in FIG. 1.

Each of the cells 4 intended to receive a fuel rod generally includes two adjacent walls at 90°, on each of which a spring such as the spring 6 is mounted, the other two adjacent walls of the cell, each arranged opposite a wall receiving a spring, including two dimples such as the dimple 7 of the cell 4a represented in FIG. 1. Each of the walls arranged opposite a wall provided with a spring includes two dimples aligned with the axial direction of the cell and arranged in the vicinity of the upper part and in the vicinity of the lower part of the wall, respectively.

The dimples such as the dimple 7 are made by cutting the wall of the cell in an end zone of this wall in the axial direction and pushing the metal of the wall into the cell.

As shown by FIG. 1, a dimple 7 that projects into the cell 4a is made by cutting a wall 5 of the cell 4a along two mutually parallel lines or along a line parallel to one edge of the cell and by pushing in the metal of the wall. The dimple 7 has, in a plane perpendicular to the wall, a cross-section substantially with the shape of a trapezium.

A dimple 7' is also made, in an axial end part of the wall, on a wall adjacent to the wall 5 on which the dimple 7 was made, the dimple 7' being pushed in so as to project into a cell 4b next to the cell 4a. The dimple 7', which is a dimple for supporting a fuel rod introduced into the cell 4b, is made in an end zone of the wall 5 located beyond the upper end of the spring 6.

A second dimple, similar to the dimple 7', is also made in the end part of the wall of the cell bearing the spring 6, below the lower end of the spring 6.

4

The wall 5 common to the neighbouring cells 4a and 4c in which the dimples such as the dimple 7 are made bears a spring 6' mounted in the axial direction of the cell between the dimples made in this wall.

The springs such as 6 and 6' are attached springs made of different material from the material constituting the walls 2 and 3 of the cells 4 of the spacer grid. In general, the straps 2 and 3 constituting the spacer grid 1 are made of a zirconium alloy and the attached springs such as 6 and 6' are made of a nickel alloy with high elasticity and high strength.

Each of the springs such as 6 and 6' includes two ends parts, such as 6a, by means of which the spring is held on the wall of the cell, for example using a holding fixture 8 made in the same way as a dimple and having a width less than the width of a dimple and being pushed into the cell to a lesser distance. Between its end zones, such as the zone 6a, including a planar part, the spring 6 includes a central part which may be planar and which lies out of a bearing plane constituted by the planar end zones of the spring 6. The central part, which constitutes the active part of the spring 6, projects into the cell 4a.

FIGS. 2 and 3 represent a part of a wall 5 of a cell of the grid, constituted by a portion of a metal strap.

The strap constituting the wall 5 is cut in its upper part in the form of a slot 9a passing through the entire thickness of the metal strap constituting the wall 5. The slot 9a is parallel to the upper edge of the wall and is arranged at a distance from this edge corresponding to the height of a dimple for supporting a fuel rod. The metal of the wall 5, between the slot 9a and the upper edge, is pushed in so as to produce a dimple 7a of substantially trapezoidal cross-section, projecting into a spacer grid cell 4" defined by the wall 5.

The strap 5 is also cut in its lower part in the form of two slots 9b and 9'b parallel to the upper and lower edges of the wall, and therefore parallel to the slot 9a, which are separated by a distance corresponding to the height of a dimple. The metal of the wall is pushed, between the two slots 9b and 9'b, into the cell 4", so as to produce a dimple of trapezoidal cross-section projecting into the cell 4", in the lower end part of the wall 5.

The wall 5 also includes a first cutout 10a and a second cutout 10b of rectangular shape, the length of which is less than the length of the slots 9a, 9b and 9'b, but the width of which is substantially greater than the width of the slots 9a, 9b and 9'b.

The outer longitudinal edge of the openings 10a and 10b is arranged at a distance from the slot 9a and from the slot 9b, respectively, which is less than the height of the dimples 7a and 7b. The metal of the wall between the outer edge of the opening 10a and of the opening 10b and the slot 9a or 9b located opposite is pushed in the opposite direction to the dimples 7a and 7b, so as to constitute two holding fixtures 8a and 8b having a substantially trapezoidal cross-section, projecting into the cell 4' which is next to the cell 4" and separated from it by the wall 5.

The wall 5 including the cutouts, dimples and holding fixtures which have been described makes it possible to receive a spring 6 constituted by a single metal leaf made of nickel alloy, which is shaped so that it can be mounted in the axial direction 11 on the wall 5 of the cell. In FIG. 3, the contour of the leaf-type spring 6 has been represented by a broken line.

In FIGS. 2 and 4, the spring 6 has been represented in longitudinal section and, respectively, in its service position and during mounting on the strap 5.

The spring 6 includes, along its length, a first end zone 6a, a second end zone 6b and, between the end zones 6a and 6b, a central part 6c including a planar bearing surface.

The end parts 6a and 6b of the spring, via which the spring is held on the wall 5, each include a planar part which bears on a face of the wall 5 facing into the cell 4'. The planar bearing parts of the spring 6 are therefore located in the same plane, constituting the bearing plane of the spring. The central part 6c of the spring 6 includes a planar bearing surface for a fuel rod, which lies out of the plane by which the spring bears on the wall 5, so that the central part 6c of the spring projects into the cell 4'. The planar central bearing part of the spring is connected to the end parts by two inclined junction parts made by folding the metal leaf constituting the spring.

As shown by FIGS. 2, 4 and 5, the end parts of the spring, such as the lower end part 6b, include two lateral flanges such as the lateral flanges 6d and 6e, which are folded out of the bearing plane of the end part of the spring, on that side of the bearing plane which lies opposite the projecting central part 6c of the spring. The lateral flanges such as 6d and 6e of the end parts of the spring 6 are made by providing the end parts of the leaf constituting the spring with a width greater than the width of the main span of the spring and by folding the laterally projecting end parts of the spring towards each other.

FIG. 5 shows the cross-section of the end part 6b of the spring, which has a trapezoidal shape, the two flanges 6d and 6e of the end part of the spring 6 being inclined relative to the planar bearing surface of the end part 6b of the spring.

As shown by FIG. 5, the shape of the centre of the cross-section of the end part of the spring corresponds to the shape of the internal surface of the holding fixture 8b, so that the end part of the spring can be engaged under the holding fixture 8b.

In addition, the flanges 6d and 6e of the end part of the spring have a length and an orientation such that the outer ends of the flanges 6d and 6e lie opposite the dimple 7b of the wall 5 projecting into the cell 4", and such that the flanges 6d and 6e are oriented substantially at 90° to the inclined sides of the cross-section of the dimple opposite which they lie, when the spring is in the mounted position.

Furthermore, the total length of the spring 6 between its upper end and its lower end is slightly less than the distance separating the dimple 7a from the dimple 7b.

When the spring 6 is mounted on the wall 5, its longitudinal ends are separated by a clearance from the dimples 7a and 7b. However, the flanges such as 6d and 6e hold the spring 6 because they lie opposite a part of the dimples 7a and 7b. In its mounted position represented in FIGS. 2 and 5, the spring 6 is therefore held perfectly by the holding fixtures 8a and 8b and by the dimples 7a and 7b. The spring, in the form of a single leaf, is held without it being necessary to carry out welding.

FIG. 4 represents the wall 5 of the grid and the spring 6 during a phase of mounting the spring 6 on the wall 5.

In order to mount the spring 6, the leaf of the spring 6 is engaged through the opening 10b between the holding fixture 8b and the planar central bearing part of the wall 5, the end part 6a of the spring, having a cross-section in the shape of a trapezium, being engaged first in the opening 10b. The spring is slid into the opening 10b then a thrust schematized by the arrow 12 is exerted on the end part 6a of the spring, so as to engage it below the holding fixture 8a, while continuing to slide the entire spring through the opening 10b. After the spring has been put in place, the end part 6b of the spring, comprising the flanges 6d and 6e, is housed under the holding fixture 8b. Simultaneously, the opposite part of the spring, which is engaged in the opening 10a of the wall 5, is housed under the holding fixture 8a. The spring is then in place, as represented in FIG. 2. Positioning of the spring is therefore extremely simple and does not require any welding or shaping operation.

FIG. 6 represents an alternative embodiment of a spring and of the means for holding it on a wall of a cell of a spacer grid according to the invention.

The corresponding elements in FIGS. 2 to 5 on the one hand and 6 on the other hand have the same references, but with the suffix ' (prime) as regards the elements represented in FIG. 6.

The wall 5' is cut and pushed in at its end zones, so as to have two dimples 7'a and 7'b.

Rectangular openings 10'a and 10'b are made after the dimples 7'a and 7'b, so that a part 8'a or 8'b of the strap is interposed between the dimple and the corresponding opening. The cutouts and openings in the wall are therefore made identically to the cutouts in the wall 5 represented, for example, in FIG. 2. The wall therefore successively includes, starting from a dimple 7'a or 7'b, towards the second dimple, a part 8'a or 8'b for supporting the spring adjacent to the dimple, and an opening 10'a or 10'b adjacent to the bearing part 8'a or 8'b.

In contrast to the embodiment of FIGS. 2 to 5, the bearing part 8'a or 8'b of the wall is not pushed in to form a holding fixture projecting from the wall 5 on the side opposite the dimple 7'a. The bearing parts 8'a and 8'b of the spring 6' therefore lie in alignment with the faces of the strap.

The spring 6' has two end parts 6'a and 6'b for mounting it on the wall 5', which each include two inclined flanges folded towards each other, such as the flange 6'e of the lower part of the spring, or the flange 6'f of the upper part of the spring. Between the end parts 6'a and 6'b which allow it to be mounted, the spring 6' includes a central bearing part 6'c which may advantageously be made in the form of a planar surface connected to the end parts by inclined branches of the spring, made by folding the metal leaf constituting the spring.

In order to allow the end parts 6'a and 6'b of the spring to engage through the openings 10'a and 10'b in order to bring them to bear under the bearing parts 8'a and 8'b of the wall 5', the inclined branches of the spring 6' have two successive parts with different slopes. It is thus possible to slide the spring 6' through the openings 10'b and 10'a and underneath the bearing parts 8'a and 8'b of the wall 5'. It should be noted that, when it is in its mounted position, the spring 6' bears via its end parts against the surface of the wall 5' facing the cell located opposite the cell into which the spring 6' projects.

It should also be noted that the wall 5' includes, in its central part and in a position equidistant from openings 10'a and 10'b, a dimple 13 in the shape of a spherical cap projecting into the cell in which the spring 6' is mounted, and opposite the projecting bearing part 6'c of the spring 6'. The dimple 13 provides for abutment of the active central part of the spring 6' in the event that an excessive force is exerted on the spring 6' via the fuel rod introduced into the cell. Such an excessive force on the rod can be exerted, for example, during handling of the fuel assembly, in the event of catching on an obstacle or another fuel assembly. Movement of the rod and deformation of the spring 6' is thus avoided.

FIG. 7 represents a wall of a spacer grid, according to the invention and according to a second embodiment, on which a spring is fixed. The corresponding elements in FIG. 7 and in FIGS. 2 to 5 or 6 have the same references, but with the suffix " (second) as regards the elements represented in FIG. 7 relating to a second alternative embodiment.

The wall 5" on which the spring 6" is fixed includes a first dimple 7"a and a second dimple 7"b at its ends. The dimples 7"a and 7"b are obtained by making two parallel slots through the wall 5" by cutting, and by pushing in the metal of the wall between the two slots.

A holding fixture 8"a is also made, in an arrangement adjacent to the dimple 7"a and after the dimple 7"a in the direction of the second dimple 7"b, by cutting a third slot, parallel to the two slots defining the dimple 7"a, in the metal of the wall 5" and by pushing in the metal between the second and third slots in order to make a holding fixture 8"a, the width of which and the distance by which it is pushed in relation to the wall 5" are less than the corresponding dimensions of the dimple 7"a.

In addition, a rectangular opening 10"b is made through the wall 5" by cutting, at a certain distance from the dimple 7"b in the direction of the first dimple 7"a, so as to form a bearing part 8"b on the wall 5" in an arrangement adjacent to the dimple 7"b.

The spring 6" includes a projecting active central part 6"c and two ends parts 6"a and 6"b by which the spring 6" can be fixed to the wall 5".

The end part 6"a is entirely planar, and the part 6"b includes two flanges folded towards each other out of the plane of the planar end part of the spring, in the opposite direction from the active central part 6"c of the spring that projects relative to the planar parts of the ends of the spring. One of the flanges 6"e of the end part 6"b of the spring 6" has been represented in FIG. 7.

The spring 6" is mounted on the wall 5" by introducing the planar end part 6"a of the spring 6" under the holding fixture 8"a making it possible to hold the planar end part 6"a against the strap 5", and by introducing the second end part 6"b of the spring 6" into the opening 10"b. The end part 6"b is preferably introduced into the opening 10"b before the flanges, such as 6"e, of this end part are folded out of the plane of the end of the spring. The flanges such as 6"e are folded towards each other after the spring has been put in place, so that the stop 7"b retains and locks the spring 6" via the flanges such as 6"e of the end part of the spring.

Fastening of the spring is completed by a spot weld 14 between the end of the part 6"a of the spring and the upper edge of the wall 5".

The wall 5" may advantageously include, in its central part, a dimple 13" of spherical cap shape for limiting the deformation of the spring 6" on which a fuel rod will bear.

In all cases, the spacer grid according to the invention allows simple manufacture and fitting of springs on the walls of the cells of the grid. Furthermore, the springs are held and immobilized on the walls in satisfactory fashion by means of the dimples, the holding fixtures or the bearing parts of the wall receiving the spring.

The embodiment according to the invention therefore allows considerable simplification of the manufacture of spacer grids for a fuel assembly.

The invention is not limited to the embodiments which have been described.

Thus, the dimples or holding fixtures may be produced in a manner different from those which have been described.

It is also possible to combine the dimples, holding fixtures and bearing parts of the walls receiving the springs in a manner different from those which have been described.

The opening or openings passing through the wall on which the spring is mounted may have any size and any shape facilitating introduction and mounting of the spring.

The invention applies to any structural spacer grid associated with other identical grids in the framework of a fuel assembly or to spacer grids of different types, made for fulfilling the functions of retention of rods or of agitating fluid through the fuel assembly in the reactor when in service. Producing the spring as described makes it possible to obtain distances between the rods and dimensions of the water flow spaces around the rods which are substantially constant over the entire surface of the spacer grid.

What is claimed is:

1. A spacer grid of a fuel assembly for a nuclear reactor, consisting of interlaced metal straps (2, 3) defining a regular lattice of cells (4), at least a part of which includes, for each cell (4, 4a, 4b, 4', 4"), at least one wall (5) for separation from a neighbouring cell, constituted by a portion of a strap, on which a spring (6, 6', 6") for holding a fuel rod intended to be housed in the cell (4, 4a) is attached and held, the wall of the cell (4, 4a) being cut and pushed into the neighbouring cell (4b, 4") in two end zones spaced apart in a longitudinal mounting direction of the spring (6, 6', 6"), in order to constitute two dimples (7, 7', 7a, 7b, 7'a, 7'b) for holding a rod in the neighbouring cell (4", 4b), wherein, for each of the walls (5) on which a spring (6, 6', 6") is attached, the spring (6, 6', 6") is constituted by a single metal leaf including two end parts (6a, 6b, 6'a, 6'b, 6"a, 6"b) substantially in the same plane and a central part (6c, 6'c, 6"c) out of the plane of the end parts, at least one of the end parts being laterally provided with two flanges (6d, 6e, 6'e, 6"e, 6'f) folded out of the plane of the end part (6a, 6b, 6'a, 6'b, 6"b) in the opposite direction from the central part (6c, 6'c, 6"c) of the spring (6, 6', 6"), and wherein the wall (5, 5', 5") intended to receive an attached spring includes, in an arrangement adjacent to each of the dimples (7a, 7b, 7'a, 7'b, 7"a, 7"b), in the direction of the second dimple, a part (8a, 8b, 8'a, 8'b, 8"a, 8"b) for holding an end of the spring (6, 6', 6") and, in an arrangement adjacent to at least one of the holding parts (8a, 8b, 8'a, 8'b, 8"a, 8"b), at least one opening (10a, 10b, 10'a, 10'b, 10"b) passing through the wall.

2. A spacer grid according to claim 1, wherein the wall (5) includes two parts (8a, 8b), for holding the ends (6a, 6b) of the spring (6), which consist of holding fixtures made by cutting and pushing in portions of the wall (5), so as to project from a face of the wall (5) opposite a face of the wall (5) from which the dimples (7a, 7b) project.

3. The spacer grid according to claim 2, wherein the wall (5) includes, in an arrangement adjacent to each of the holding fixtures adjacent to a first dimple (7a, 7b), a through-opening (10a, 10b) in the direction of the second dimple (7a, 7b).

4. The spacer grid according to claim 1, wherein the parts (8'a, 8'b), for holding the ends (6'a, 6'b) of the spring (6'), consist of bearing parts of the wall (5'), each interposed, in the axial direction of the wall (5'), between a dimple (7'a, 7'b) and an opening (10'a, 10'b) passing through the wall (5'), the end parts (6'a, 6'b) of the spring (6') bearing against the bearing parts (8'a, 8'b) of the wall (5'), on the side of the wall (5') from which the dimples (7'a, 7'b) project, the spring (6') being pressed flat by a flexural elastic restoring force against the parts (8'a, 8'b).

5. The spacer grid according to claim 1, wherein the wall (5") intended to receive an attached spring (6") includes, in an adjacent arrangement relative to a first dimple (7"a), in the direction of the second dimple (7"b), a holding fixture (8"a) made by cutting and pushing the wall (5") in the opposite direction from the dimple (7"a) and, in an arrangement adjacent to the second dimple (7"b), a bearing part (8"b) of the wall (5") then an opening (10"b) passing through the wall (5"), in the direction of the first dimple (7"a), the spring (6") including an entirely planar first end part (6"a) and a second end part (6"b) including two lateral flanges (6"e) folded out of a bearing plane of a planar part of the end part (6"b).

6. The spacer grid according to claim 5, wherein an edge of the planar end part (6"a) of the spring (6") is fixed by a weld (14) on an end edge of the wall (5").

7. The spacer grid according to any one of claims 1 to 6, wherein the flanges (6d, 6e, 6'e, 6"e) of at least one end part of the spring (6, 6', 6") have an inclination and a length such that at least one end part of the flanges (6d, 6e, 6'e, 6"e) lies opposite a part of a dimple (7a, 7b, 7'a, 7'b, 7"b) and has a direction essentially perpendicular to an edge of the dimple (7a, 7b, 7'a, 7'b, 7"b).

8. The spacer grid according to any one of claims 1 to 6, wherein at least one part (8a, 8b, 8"a), for holding an end of the spring (6, 6"), is made in the form of a holding fixture which is pushed in relation to the plane of the wall (5, 5") and the profile of which, in a plane perpendicular to the wall (5, 5"), makes it possible to accommodate an end part of the spring (6, 6") laterally provided with two flanges (6d, 6e, 6"e) folded out of the plane of the end part of the spring (6, 6").

9. The spacer grid according to any one of claims 1 to 6, wherein the spring (6, 6', 6") includes a central part (6c, 6'c, 6"c) which is at least partially planar for supporting a fuel rod.

10. The spacer grid according to any one of claims 1 to 6, wherein the wall (5', 5") includes, in a central part essentially equidistant from the dimples (7'a, 7"a, 7'b, 7"b) in the axial direction, a dimple (13, 13") projecting into the cell, plumb with the central part (6'c, 6"c) of the spring (6', 6").

* * * * *